United States Patent
Liu

(10) Patent No.: US 10,827,439 B2
(45) Date of Patent: Nov. 3, 2020

(54) LOAD-BASED POWER ADJUSTMENTS FOR CELLULAR COMMUNICATION SITES

(71) Applicant: T-Mobile USA, Inc., Bellevue, WA (US)

(72) Inventor: Chunming Liu, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/778,201

(22) Filed: Jan. 31, 2020

(65) Prior Publication Data

US 2020/0169965 A1     May 28, 2020

Related U.S. Application Data

(62) Division of application No. 15/277,895, filed on Sep. 27, 2016, now Pat. No. 10,588,094.

(51) Int. Cl.
| | |
|---|---|
| *H04W 52/34* | (2009.01) |
| *H04W 24/02* | (2009.01) |
| *H04W 24/10* | (2009.01) |
| *H04W 52/02* | (2009.01) |
| *H04W 16/08* | (2009.01) |

(52) U.S. Cl.
CPC ......... *H04W 52/343* (2013.01); *H04W 24/02* (2013.01); *H04W 24/10* (2013.01); *H04W 52/0206* (2013.01); *H04W 16/08* (2013.01); *Y02D 70/00* (2018.01)

(58) Field of Classification Search
CPC .................................................. H04W 52/343
USPC ................................................ 455/446, 525
See application file for complete search history.

(56) References Cited

U.S. PATENT DOCUMENTS

| | | | |
|---|---|---|---|
| 2013/0310048 A1 | 11/2013 | Hunukumbure et al. | |
| 2014/0011534 A1* | 1/2014 | Dimou | H04W 52/343 455/522 |
| 2015/0023163 A1* | 1/2015 | Gonzalez | H04L 41/0833 370/230 |
| 2015/0156714 A1 | 6/2015 | Xia | |
| 2018/0092049 A1 | 3/2018 | Liu | |

FOREIGN PATENT DOCUMENTS

| | | |
|---|---|---|
| EP | 2719214 A1 | 4/2014 |
| JP | 2016527840 A | 9/2016 |
| KR | 101633214 B1 | 6/2016 |

OTHER PUBLICATIONS

Extended European Search Report dated Mar. 3, 2020 for European Patent Application No. 17857187.3, 10 pages.

(Continued)

*Primary Examiner* — Chuck Huynh
(74) *Attorney, Agent, or Firm* — Lee & Hayes, P.C.

(57) ABSTRACT

For a cluster of cellular communication sites, the power consumption and data load of each site is measured over multiple time periods to determine an energy factor indicating the degree by which the power consumption of each site increases with increasing data load. The energy factors are then analyzed to determine coverage area sizes for the communications sites that will serve a given area while taking advantage of more efficient site to reduce overall power consumption of the cluster of sites. Transmission power levels are then adjusted at the sites to achieve these coverage area sizes.

20 Claims, 3 Drawing Sheets

(56) References Cited

OTHER PUBLICATIONS

Ismaili et al, "Reducing Power Consumption of Cellular Networks by Using Various Cell Types and Cell Zooming", The Third International Conference on E-Technologies and Networks for Development (ISCEND2014), IEEE, Apr. 29, 2014, pp. 33-38.

Liu,et al., "Downlink Power Allocation in Wireless CDMA Voice Networks", in proceedings of the 7th World Multiconference on Systemics, Cybernetics and Informatics, Orlando, FL, Jul. 2003, 6 pgs.

Office action for U.S. Appl. No. 15/277,895, dated Mar. 21, 2019, Liu, "Load-Based Power Adjustments for Cellular Communication Sites", 8 pages.

Office Action for U.S. Appl. No. 15/277,895, dated May 31, 2019, Liu, "Load-Based Power Adjustments for Cellular Communication Sites", 9 pages.

Office Action for U.S. Appl. No. 15/277,895, dated Sep. 20, 2018, Liu, "Load-Based Power Adjustments for Cellular Communication Sites", 7 pages.

PCT Search Report and Written Opinion dated Jan. 5, 2018 for PCT Application No. PCT/US17/51180, 12 pages.

Wu, et al., "Energy-Efficient Base-Stations Sleep-Mode Techniques in Green Cellular Networks: A Survey", IEEE Communication Surveys & Tutorials, vol. 17, No. 2, Feb. 12, 2015, pp. 803-826.

\* cited by examiner

LOAD-BASED POWER ADJUSTMENTS FOR CELLULAR COMMUNICATION SITES

CROSS REFERENCE TO RELATED APPLICATIONS

This is a divisional application with claims priority to commonly assigned, co-pending U.S. patent application Ser. No. 15/277,895, filed Sep. 27, 2016. Application Ser. No. 15/277,895 is fully incorporated herein by reference.

BACKGROUND

Energy costs can be significant for operators of cellular communication systems. Furthermore, the energy used by cellular radio sites of such systems can be a significant portion of total system energy usage. Management of radio site energy usage is therefore an important part of ensuring business health and revenue growth for cellular service providers.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1A shows an initial configuration of coverage areas. FIG. 1B shows an updated or adjusted configuration of the coverage areas.

DETAILED DESCRIPTION

The described implementations provide devices, systems, and methods for managing energy usage by cellular radio and radio-related components in an infrastructure having multiple cellular sites. In particular, techniques are introduced for determining the energy efficiencies of multiple cellular sites within a cluster of cellular sites having potentially overlapping coverage areas. The sites of the cluster are then configured so that coverage areas of highly efficient cells are enlarged while the coverage areas of less efficient cells are reduced.

In a described embodiment, data throughput and energy usage are monitored over multiple time periods for multiple cellular sites. The energy efficiencies of the sites are then calculated based on this data. More specifically, historical energy and throughput data are analyzed to predict the energy consumption of each site as a function of the data throughput of the site.

Each site has a configurable coverage area. The coverage areas of the sites overlap each other to produce an aggregate coverage area. In accordance with embodiments described herein, the coverage areas of the sites are adjusted based on the energy efficiencies of the sites. Specifically, the coverage areas of sites having relatively high efficiencies are increased while the coverage areas of sites having relatively low efficiencies are decreased, while maintaining an approximately unchanged aggregate coverage area.

Figure 1B:
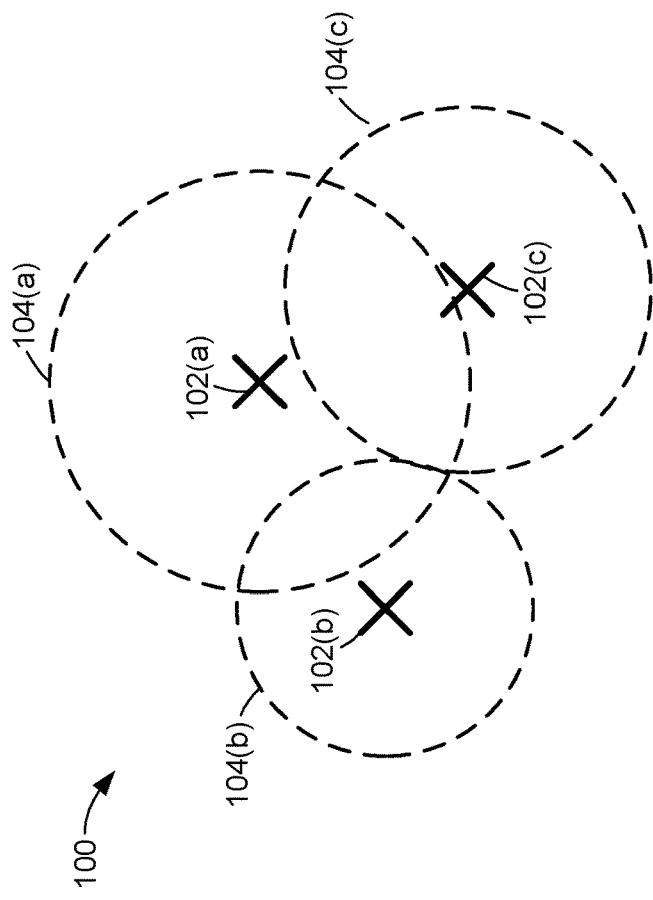
FIGS. 1A and 1B are representations of cellular communication sites and associated coverage areas.
Figure 1A:
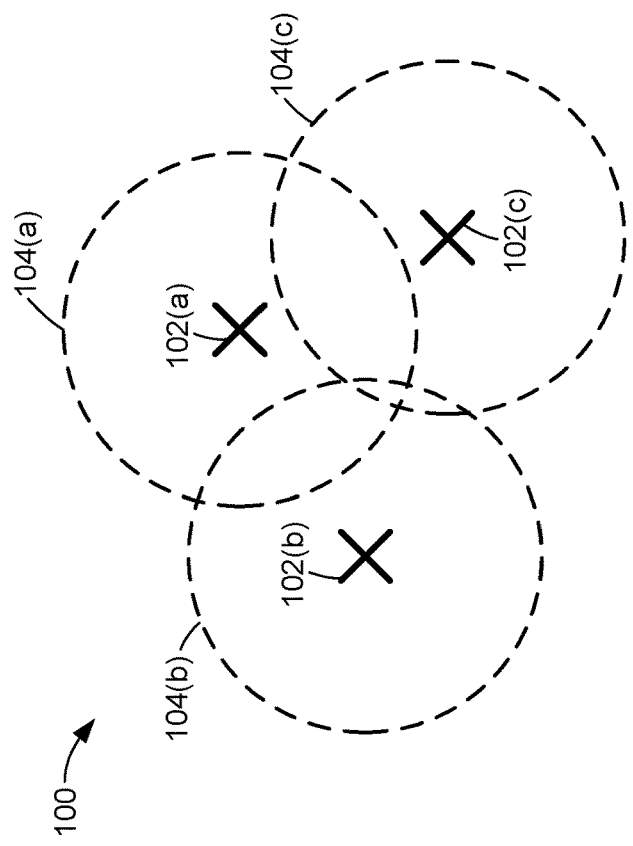

FIG. 1A shows a portion of an example cellular communications infrastructure 100. The infrastructure 100 includes a cluster of three cellular sites 102(a), 102(b), and 102(c), which for purposes of illustration are represented as X's. Each site may comprise a base station such as an eNodeB, as well as additional associated equipment.

Each site 102 has a corresponding coverage area or radius 104, indicated as a dashed circle. Site 102(a) has a coverage area 104(a), site 102(b) has a coverage area 104(b), and site 102(c) has a coverage area 104(c). Initially, the sizes of the coverage areas 104 are all approximately the same, producing an aggregate coverage area that includes the union of the coverage areas 104(a), 104(b), and 104(c).

As will be described in more detail below, energy analyses of the cellular sites 102 are performed to determine their energy consumptions as functions of load. The coverage areas 104 are then adjusted in a way that optimizes overall energy usage while maintaining approximately the same size aggregate coverage area and data throughput capabilities.

FIG. 1B shows an example of adjusted coverage areas 104 of the infrastructure 100, wherein the sizes of the coverage areas 104 are adjusted based on determined energy efficiencies of the respective cell sites 102. In the example, it is assumed that the site 102(a) has the best or highest energy efficiency. Accordingly, the size of the coverage area 104(a) of the site 102(a) has been increased. The site 102(b) has the worst or lowest energy efficiency and the size of its coverage area 104(b) has accordingly been reduced. The site 102(c) has had the size of its coverage area 104(c) slightly enlarged so that the three cell sites maintain the same aggregate coverage area. Note that the depiction of the coverage areas shown in FIGS. 1A and 1B may not accurately reflect that the aggregate coverage area has remained approximately constant.

Figure 2:
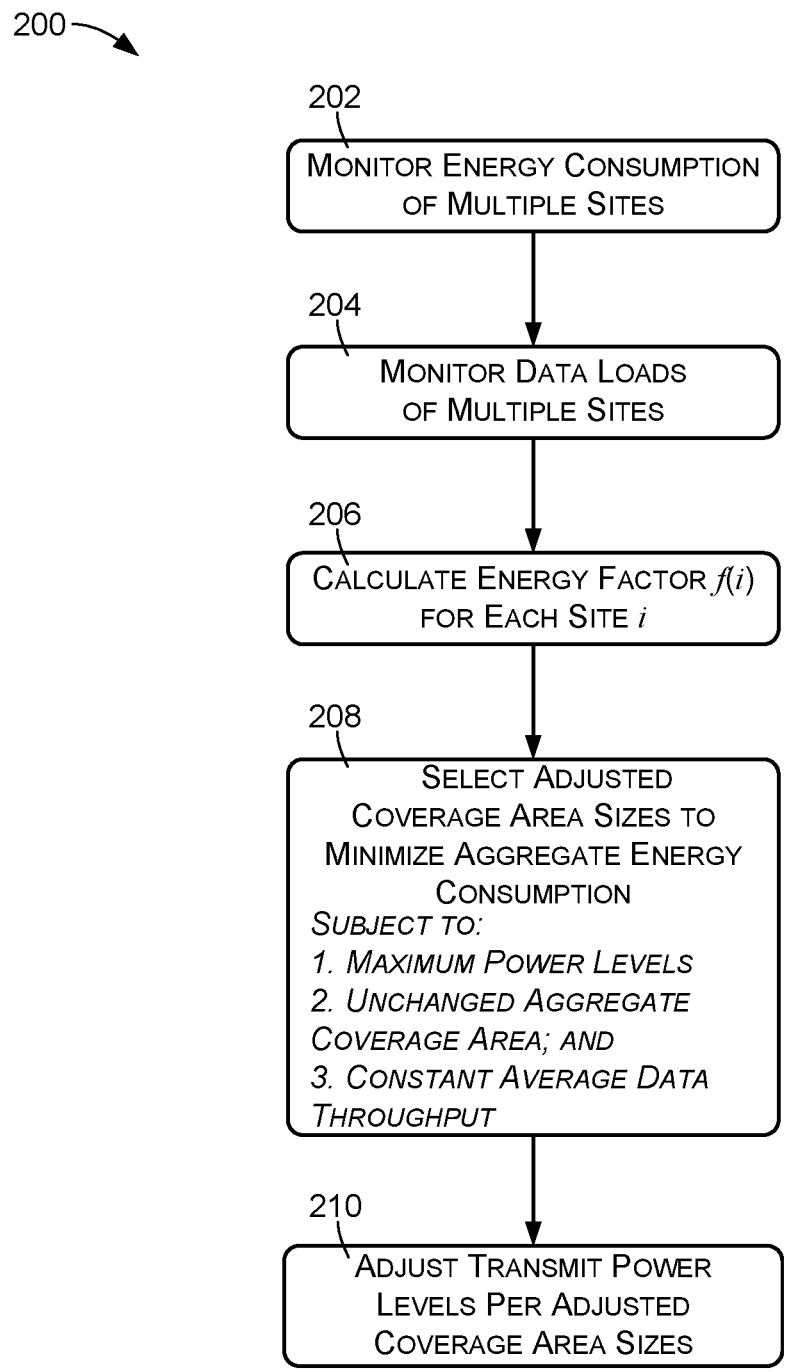
FIG. 2 is a flow diagram illustrating an example method of configuring coverage areas of multiple cellular communication sites to reduce aggregate energy consumption of the sites.

FIG. 2 illustrates an example method 200 for adjusting coverage areas for a cluster of cell sites to improve overall energy efficiencies and to lower overall energy consumption. The method 200 is applied to a cluster of two or more cell sites, and is based in part on an assumption that users and user data demands are uniformly distributed throughout the coverage areas of the cell sites. However, the method may be used even when this assumption is not strictly true.

For purposes of discussion, the site cluster is described as having n individual sites $C_0$ through $C_{n-1}$. Each site $C_i$ has a coverage area having an initial or default coverage area size $A_1(i)$. The coverage area of a site is the area within which the site provides relatively reliable communications with user mobile devices, at data transfer rates that have been deemed appropriate or adequate by the service provider. The coverage areas of the cluster potentially overlap each other, depending on the geographical layout of the sites, to form an aggregate coverage area having an initial coverage area size.

Cell site coverage area is typically represented as a circular area having a coverage radius r that is determined by the transmit power levels of the respective cellular sites or base stations. The coverage area size is therefore considered equal to $\pi r^2$. The size of a particular cell site's coverage area can be varied by varying the transmit power levels of the radio equipment of the cell site, and/or by setting or adjusting various configuration parameters of the cell site equipment that have the effect of varying the transmit power.

An action 202 comprises monitoring energy consumption of the cellular communication sites of the cluster over multiple time periods. For example, energy consumption may be monitored for each of two consecutive months. The energy consumption for a particular cellular communication site i may be represented as power(i), as follows:

power(i)=energyConsumption(i)/
(daysInMonth*totalSecondsinDay)  Equation (1)

An action 204 comprises monitoring the data load of each site i over multiple time periods. Data load is a measure of data throughput or transfer rate such as bits/second, number of current consuming users, etc. For example, the data load supported by each site may be monitored for each of two consecutive months, corresponding respectively to the same two months for which energy consumption is monitored. The data load may be calculated as follows for a site i:

load(i)=totalTraffic(i)/
(daysinMonth*totalSecondsinDay)  Equation (2)

where totalTraffic(i) represents the total amount of data transmitted and/or received during the monitored month to and/or from the site $C_i$.

An action 206 comprises analyzing (a) changes in the energy consumption of each cellular communication site i and (b) corresponding changes in the data load of each cellular communication site i to determine an energy factor for each of the multiple cell sites of a cluster. The energy factor of a site indicates a degree by which the energy consumption of the site changes in response to a change in the data load of the site.

For a particular site i, energy consumption may be defined as follows:

power(i)=radioPower(i)+nonRadioPower(i)  Equation (3)

where power(i) is the average power used by the site i. The term radioPower(i) represents power that varies as a function of site data loading, such as might be consumed by base band units (BBUs), remote radio units (RRUs), etc. The term nonRadioPower(i) is a constant for each site i and represents power that does not vary as a function of site data loading. Examples of components that contribute to non-radio-power may include things such as power supplies, air conditioners/fans, feeder links, backhaul devices, monitoring components, etc. Note that various components of a cell site may each consume a fixed amount of power as well as a variable amount of power that is dependent on load.

The variable power consumed by a site i, radioPower(i), can be represented as follows:

radioPower(i)=f(i)×load(i)  Equation (4)

where load(i) is average data throughput as described above and f(i) is a factor, referred to herein as an energy factor, that is associated with each site i. As noted above, the energy factor f(i) indicates a degree by which the energy consumption of the site i changes in response to a change in a data load of the site i.

Both power(i) and load(i) can be monitored over multiple time periods, such as monthly, and the monitored values can be used to solve for f(i). Given data for months j and k, the energy factor f(i) for a site i is calculated as follows:

f(i)=[power(i,j)−power(i,k)]/[load(i,j)−load(i,k)]  Equation (5)

where power(i,j) is the measured power usage of site i for month j, power(i,k) is the measured power usage of site i for month k, load(i,j) is the measured load or data throughput of site i for month j, and load(i,k) is the measured load or data throughput of site i for month k.

For a cluster of cell sites $C_0$ through $C_{n-1}$, the total variable amount of power consumption $P_{RP}$, referred to herein as aggregate radio power, is calculated as follows:

$$P_{RP} = \sum_{i=0}^{n-1} f(i) \times \text{load}(i) \qquad \text{Equation (6)}$$

An action 208 comprises selecting adjusted coverage area sizes $A_2(i)$ in such a way that the aggregate energy consumption of the site cluster is reduced or minimized. In other words, the coverage area sizes are adjusted or selected so as to reduce or minimize a sum of a predicted energy consumptions of the cellular communications sites, wherein the energy consumptions are predicted by Equation (3) or Equation (4).

For purposes of analysis, it is assumed that the load of each cell is proportional to the adjusted coverage area size $A_2(i)$ of the cell: load(i) $\propto A_2(i)$. Based on this assumption, the total power consumption $P_{RP}$ of the cluster of cells $C_0$ through $C_{n-1}$ can be minimized by selecting the coverage area sizes $A_2(0), A_2(1), \ldots A_2(n-1)$ of the respective cell sites to minimize the following summation:

$$\sum_{i=0}^{n-1} f(i) * A_2(i) \qquad \text{Equation (7)}$$

subject to the constraints that (a) the total consumed energy P(i) for each cell remains below its available maximum, dictated by characteristics of the cell site equipment, (b) the size of total coverage area remains unchanged after adjustment (i.e., an adjusted aggregate coverage area size $\Sigma_{i=0}^{n-1} A_2(i)$ is equal to the original aggregate coverage area size $\Sigma_{i=0}^{n-1} A_1(i)$), and (c) the average data throughput X(i) of each cell is equal or greater than a desired or predefined throughput $X_{avg}$.

More generally, the total power consumption $P_{RP}$ of the cluster of cells $C_0$ through $C_{n-1}$ can be minimized by selecting the coverage areas $A_2(0), A_2(1), \ldots A_2(n-1)$ of the respective cell sites to minimizing the following summation:

$$\sum_{i=0}^{n-1} \text{Func}(f(i), A_2(i)) \qquad \text{Equation (8)}$$

subject to the constraints enumerated above, where Func(f(i), $A_2(i)$) is some function of f(i) and A(i) that increases with an increasing energy factor f(i) and with an increasing coverage area size $A_2(i)$. In the described embodiments, Func(f(i), $A_2(i)$) is the product of f(i) and $A_2(i)$. Specifically, Func(f(i), $A_2(i)$) is f(i)*$A_2(i)$).

An action 210 comprises adjusting transmit power levels of the cellular communication sites based at least in part on the adjusted coverage area sizes. In the described embodiment, the action 210 comprises setting the transmit power level of each cellular site to achieve a coverage radius r(i) that results in the coverage area $A_2(i)$, where $A_2(i)=\pi*r(i)^2$.

The average data throughput (capacity) of X(i) of a cell site i can be calculated as follows:

X(i)=B(i)*$\log_2(1+\xi)$  Equation (9)

where B(i) is the channel bandwidth in Hertz of the cell site and ξ is the signal-to-noise (SNR) interference ratio in a signal transmitted by the cell site and received by a user device.

The SNR interference ratio ξ can be calculated as follows:

$$\xi = \frac{P_{T,1}(r)h(r)}{\sigma^2 + \sum I_k} \qquad \text{Equation (10)}$$

where $P_{T,1}(r)$ is the transmit power from the base station of the cell site for a user at a distance r from the base station, $\sigma^2$ is the white noise level, $I_k$ is the received inter-cell interference from a nearby cell site k, and h(r) is a distance factor that can be represented as follows:

$$h(r) = \left(\frac{d_0}{r}\right)^n \qquad \text{Equation (11)}$$

where $d_0$ is a close-in reference point in the far-field region of the transmitter antenna and n is the path loss index.

The interference $I_k$ can be represented as follows:

$$I_k = \overline{P}_k * h(I_k) \qquad \text{Equation (12)}$$

where $I_k$ is the distance from the base station of cell k to the user.

$\overline{P}_k$ is the average transmission power from cell k as follows:

$$\overline{P}_k = \frac{1}{S_k} \int \int_{S_k} P_{T,k}(s)ds \qquad \text{Equation (13)}$$

where $P_{T,k}(s)$ is the transmit power from base station k for the users within a unit small area ds, $S_k$ is the total area size in cell k which can be approximately represented as $\pi \cdot r^2$, and $P_k$ is total power consumed to cover all users with the area, i.e., the integral value of $P_{T,k}(s)$ over $S_k$.

Figure 3:
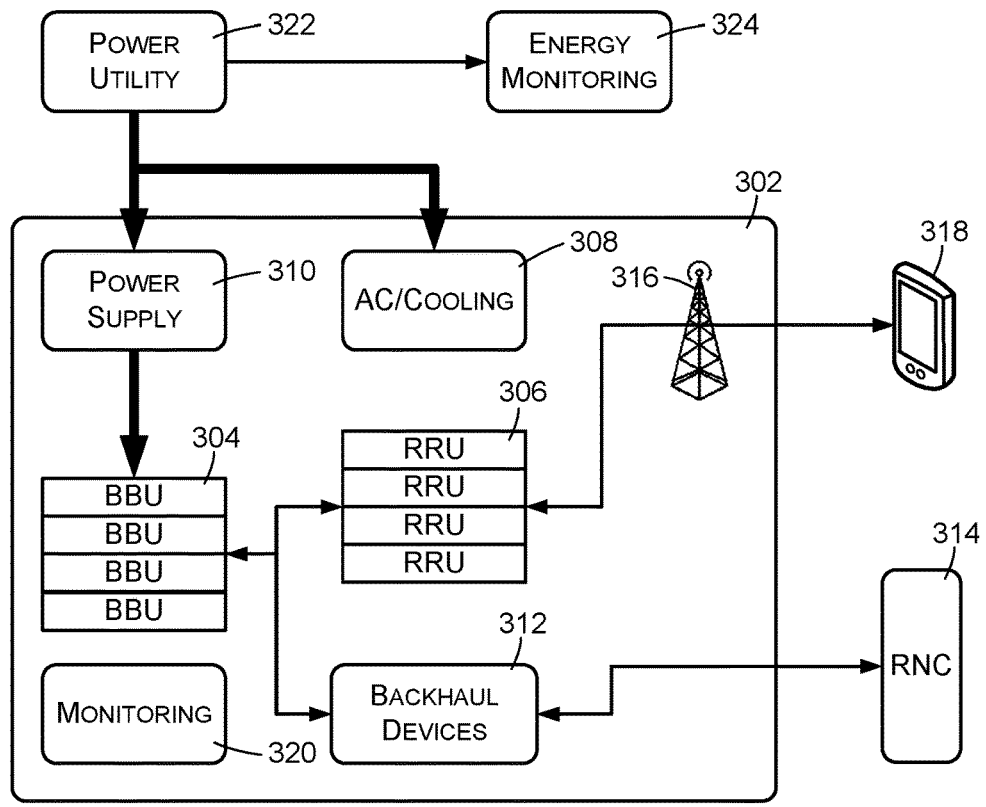
FIG. 3 is a block diagram illustrating basic components of a cellular communication site and an associated energy monitoring components.

FIG. 3 shows basic energy consumption components of an example cellular communication site 302, each of which may contribute to fixed power consumption of the site and/or to energy consumption that varies with data load. Example components include one or more baseband units (BBUs) 304; one or more remote radio units (RRUs) 306; air conditioning (AC) or other cooling equipment 308; one or more power supplies 310 that provide DC power to the BBUs 304, the RRUs 306, and other equipment; backhaul devices 312 that communicate with a radio network controller (RNC) 314 and other external equipment; an antenna 316 that represents amplifiers and other equipment used in transmitting and receiving radio-frequency signals to and from a user mobile device 318; and various monitoring equipment 320 such as energy usage meters, other meters, lights, operations, administration, and maintenance (OAM) devices, etc. The various equipment receives power from a power utility 322.

In addition to these and other components of a cellular communication site, a system of multiple cellular communication sites may include one or more energy monitoring components 324, such as one or more computers running various types of software that provide insights into energy consumption and efficiencies of the multiple sites. In the context described herein, the energy monitoring components 324 may obtain or be provided with energy usage and data load information and in response may calculate optimized coverage areas for multiple clusters of communication sites. Site technicians may be provided with the results of the optimizations. Specifically, the emerging monitoring components 324 may provide a recommended coverage area or radius for each cell site, which may be considered by technicians when setting transmission power levels of the site. In some cases, the energy monitoring components 324 may directly control transmission power levels and may accordingly implement optimized transmission power levels without human involvement.

Figure 4:
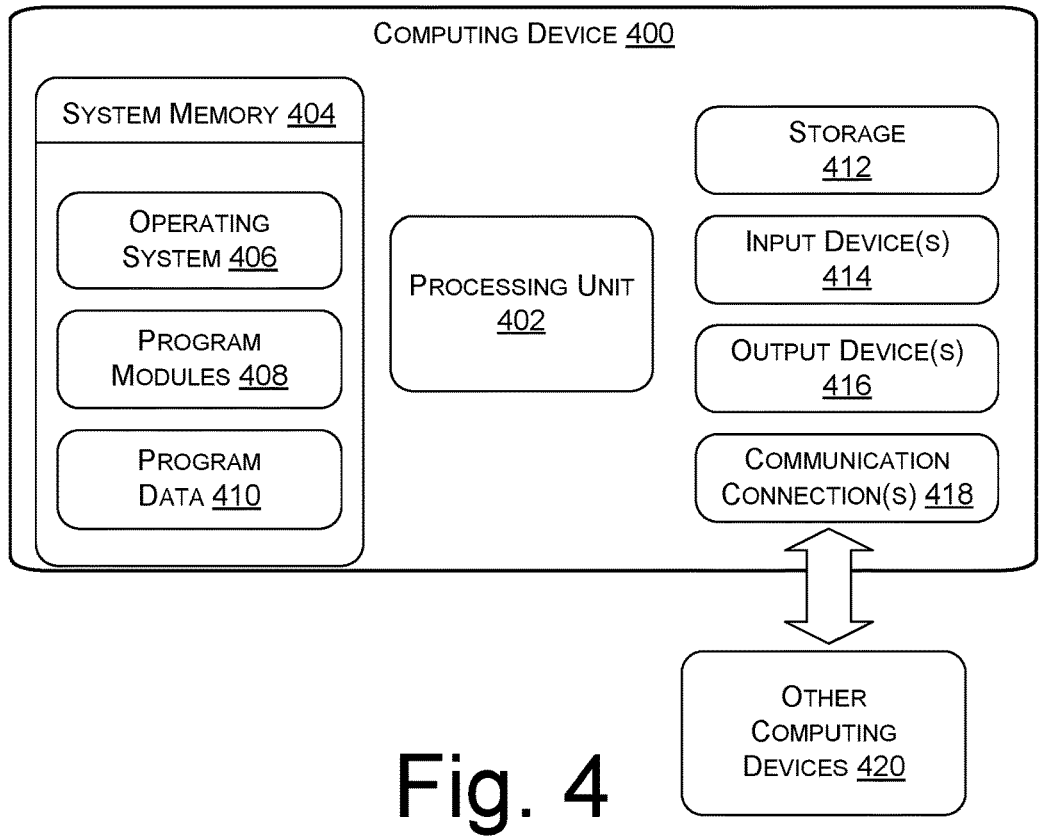
FIG. 4 is a block diagram of an example computing device that may be used to implement an energy monitoring component as described herein.

FIG. 4 illustrates an example device 400 in accordance with various embodiments. The device 400 is illustrative of an example energy monitoring component 324, and may therefore be configured to implement the method 200.

In various embodiments, the computing device 400 may include at least one processing unit 402 and system memory 404. Depending on the configuration and type of the computing device, the system memory 404 may be volatile (such as RAM), non-volatile (such as ROM, flash memory, etc.) or some combination of the two. The system memory 404 may include an operating system 406, one or more program modules 408, and may include program data 410.

The computing device 400 may also include additional data storage devices (removable and/or non-removable) such as, for example, magnetic disks, optical disks, or tape. Such additional storage is illustrated in FIG. 4 by storage 412.

Non-transitory computer storage media of the computing device 400 may include volatile and nonvolatile, removable and non-removable media implemented in any method or technology for storage of information, such as computer readable instructions, data structures, program modules, or other data. The system memory 404 and storage 412 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such non-transitory computer-readable storage media may be part of the computing device 400.

In various embodiment, any or all of the system memory 404 and storage 412 may store programming instructions that implement an executable program, which when executed by the processing unit 402 performs actions implementing some or all of the functionality described herein.

The computing device 400 may also have input device(s) 414 such as a keyboard, a mouse, a touch-sensitive display, voice input device, etc. Output device(s) 416 such as a display, speakers, a printer, etc. may also be included. The computing device 400 may also contain communication connections 418 that allow the device to communicate with other computing devices 420.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
monitoring (a) energy consumption and (b) data load of each cellular communication site i of a cluster of n cellular communication sites, each cellular communication site i having a first coverage area and a corresponding first coverage area size A1(i), wherein the first coverage areas of the cellular communication sites overlap to form a first aggregate coverage area having a first aggregate coverage area size;

analyzing (a) changes in the energy consumption of each cellular communication site i and (b) corresponding changes in the data load of each cellular communication site i to determine an energy factor f(i) of each cellular communication site i, wherein the energy factor of a particular cellular communication site indicates a degree by which the energy consumption of the particular cellular communication site changes in response to a change in the data load of the particular cellular communication site;

selecting second coverage area sizes A2(i) of each cellular communication site i so as to reduce $\Sigma_{i=0}^{n-1} \text{Func}(A_2(i), f(i))$, where $\text{Func}(A_2(i), f(i))$ is a function of $A_2(i)$ and f(i), the second coverage area sizes A2(i) corresponding to second coverage areas that overlap to form a second aggregate coverage area having a second aggregate coverage area size that is approximately equal to the first aggregate coverage area size; and adjusting transmit power levels of the cellular communication sites based at least in part on the selected second coverage area sizes.

2. The method of claim 1, wherein selecting the second coverage area sizes is performed so that each cellular cell i has at least an average data throughput.

3. The method of claim 1, the analyzing comprising:
determining the energy consumption and the data load for each cellular communication site of the cluster for a first time period j and a second time period k;
calculating the energy factor f(i) of a particular cellular communication site i in accordance with the following:

$$f(i) = [\text{power}(i,j) - \text{power}(i,k)] / [\text{load}(i,j) - \text{load}(i,k)]$$

where:
power(i,j) represents energy consumed by the particular cellular communication site i during the first time period;
power(i,k) represents energy consumed by the particular cellular communication site i during the second time period;
load(i,j) represents a data load of the particular cellular communication site i during the first time period; and
load(i,k) represents a data load of the particular cellular communication site i during the second time period.

4. The method of claim 1, wherein selecting the second coverage area sizes is performed so as to minimize $\Sigma_{i=0}^{n-1} \text{Func}(A_2(i), f(i))$ while maintaining $\Sigma_{i=0}^{n-1} A_2(i) \approx \Sigma_{i=0}^{n-1} A_1(i)$.

5. The method of claim 1, wherein $\text{Func}(A_2(i), f(i))$ comprises $A_2(i) * f(i)$.

6. The method of claim 1, wherein the coverage areas sizes correspond to respective coverage radii that are determined by the transmit power levels of the respective cellular communication sites.

7. One or more non-transitory computer storage media with a stored computer-executable program, which, when executed by one or more processors of a first device, performs actions comprising:
analyzing energy consumption of a cluster of cellular communication sites to determine an energy factor for each of the cellular communication sites, the energy factor of a particular cellular communication site indicating a degree by which the energy consumption of the particular cellular communication site changes in response to a change in a data load of the particular cellular communication site; and
varying a coverage area size of one or more of the cellular communication sites based at least in part on the energy factors of the cellular communication sites to reduce an aggregate energy consumption of the cellular communication sites while maintaining (a) a given aggregate coverage area of the cellular communication sites and (b) a given average data throughput of the cellular communication sites.

8. The one or more non-transitory computer storage media of claim 7, wherein coverage area sizes of the cellular communication sites correspond to respective coverage radii that are determined by transmit power levels of the respective cellular communication sites.

9. The one or more non-transitory computer storage media of claim 7, the actions further comprising:
calculating a predicted energy consumption of each cellular communication site as a function of the energy factor of the cellular communication site and a data load of the cellular communication site; and
selecting coverage area sizes of the cellular communication sites so as to reduce a sum of predicted energy consumptions of the cellular communication sites.

10. The one or more non-transitory computer storage media of claim 7, wherein varying the one or more coverage area sizes is performed so as to to minimize $\Sigma_{i=0}^{n} \text{Func}(A(i) * f(i))$, where n is a number of cellular communication sites in the cluster, A(i) is a coverage area size of an individual cellular communication site i of the cluster, f(i) is the energy factor of the individual cellular communication site I, and Func(A(i), f(i)) is a function of A(i) and f(i).

11. The one or more non-transitory computer storage media of claim 7, wherein varying the one or more coverage area sizes is performed so as to minimize $\Sigma_{i=0}^{n} A(i) * f(i)$, where n is a number of cellular communication sites in the cluster, A(i) is a coverage area size of an individual cellular communication site i of the cluster, and f(i) is the energy factor of the individual cellular communication site i.

12. A system comprising:
a processor; and
programming instructions which, when executed by the processor, cause the system to perform operations including:
monitoring (a) energy consumption and (b) data load of each cellular communication site i of a cluster of n cellular communication sites, each cellular communication site i having a first coverage area and a corresponding first coverage area size A1(i), wherein the first coverage areas of the cellular communication sites overlap to form a first aggregate coverage area having a first aggregate coverage area size;
analyzing (a) changes in the energy consumption of each cellular communication site i and (b) corresponding changes in the data load of each cellular communication site i to determine an energy factor f(i) of each cellular communication site i, wherein the energy factor of a particular cellular communication site indicates a degree by which the energy consumption of the particular cellular communication site changes in response to a change in the data load of the particular cellular communication site;
selecting second coverage area sizes A2(i) of each cellular communication site i so as to reduce $\Sigma_{i=0}^{n-1} \text{Func}(A_2(i), f(i))$, where $\text{Func}(A_2(i), f(i))$ is a function of $A_2(i)$ and f(i), the second coverage area sizes A2(i) corresponding to second coverage areas that overlap to form a second aggregate coverage area; and adjusting transmit power levels of the cellular communication sites based at least in part on the selected second coverage area sizes.

13. The system of claim 12, wherein selecting the second coverage area sizes is performed so that each cellular cell i has at least an average data throughput.

14. The system of claim 12, wherein the operations further include:

determining the energy consumption and the data load for each cellular communication site of the cluster for a first time period j and a second time period k;

calculating the energy factor f(i) of a particular cellular communication site i in accordance with the following:

$$f(i)=[\text{power}(i,j)-\text{power}(i,k)]/[\text{load}(i,j)-\text{load}(i,k)]$$

where:

power(i,j) represents energy consumed by the particular cellular communication site i during the first time period;

power(i,k) represents energy consumed by the particular cellular communication site i during the second time period;

load(i,j) represents a data load of the particular cellular communication site i during the first time period; and load(i,k) represents a data load of the particular cellular communication site i during the second time period.

15. The system of claim 12, wherein selecting the second coverage area sizes is performed so as to minimize $\Sigma_{i=0}^{n-1}\text{Func}(A_2(i), f(i))$ while maintaining $\Sigma_{i=0}^{n-1}A_2(i) \approx \Sigma_0^{n-1}A_1(i)$.

16. The system of claim 12, wherein $\text{Func}(A_2(i), f(i))$ comprises $A_2(i)*f(i)$.

17. The system of claim 12, wherein the coverage areas sizes correspond to respective coverage radii that are determined by the transmit power levels of the respective cellular communication sites.

18. The system of claim 12, wherein the second aggregate coverage area having a second aggregate coverage area size that is approximately equal to the first aggregate coverage area size.

19. The system of claim 12, wherein the operations further include:

predicting an energy consumption as a function of data load; and varying a coverage area size setting of at least one of the cellular communication sites based at least in part on the predicted energy consumption of the cellular communication sites to reduce an aggregate energy consumption of the cellular communication sites.

20. The system of claim 19, wherein the coverage area size setting of said at least one of the cellular communication sites corresponds to a coverage radius that is determined by a transmit power level of said at least one of the cellular communication sites.

* * * * *